United States Patent
Xie et al.

(10) Patent No.: US 11,284,325 B2
(45) Date of Patent: Mar. 22, 2022

(54) CELL SIGNAL QUALITY DETERMINATION METHOD, CELL SELECTION OR RESELECTION METHOD, DEVICE AND MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Fang Xie, Beijing (CN); Liang Xia, Beijing (CN); Nan Hu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 16/927,167

(22) Filed: Jul. 13, 2020

(65) Prior Publication Data

US 2020/0344660 A1 Oct. 29, 2020

Related U.S. Application Data

(63) Continuation of application No. PCT/CN2019/070695, filed on Jan. 7, 2019.

(30) Foreign Application Priority Data

Jan. 19, 2018 (CN) .......................... 201810055279.1

(51) Int. Cl.
*H04W 4/00* (2018.01)
*H04W 36/30* (2009.01)
(Continued)

(52) U.S. Cl.
CPC ........... *H04W 36/30* (2013.01); *H04W 36/08* (2013.01); *H04W 48/20* (2013.01); *H04W 72/046* (2013.01); *H04W 72/06* (2013.01)

(58) Field of Classification Search
CPC ..... H04W 36/30; H04W 36/08; H04W 48/20; H04W 72/046; H04W 72/06;
(Continued)

(56) References Cited

U.S. PATENT DOCUMENTS

| 7,515,928 B2 * | 4/2009 | Kang ................... H04W 48/20 455/525 |
| 10,390,296 B2 * | 8/2019 | Chen ................. H04W 36/0061 |

(Continued)

FOREIGN PATENT DOCUMENTS

| CN | 104137611 A | 11/2014 |
| CN | 105744591 A | 7/2016 |

(Continued)

OTHER PUBLICATIONS

Huawei et al., "Remaining issues on cell quality derivation," R2-1708702, 3GPP TSG-RAN WG2#99, Aug. 25, 2017 pp. 1-3.
(Continued)

*Primary Examiner* — Amancio Gonzalez
(74) *Attorney, Agent, or Firm* — Mintz Levin Cohn Ferris Glovsky and Popeo, P.C.; Steven M. Jensen

(57) ABSTRACT

A cell signal quality determination method, a cell selection and reselection method, a communication device and a storage medium are provided. The cell signal quality determination method applied to user equipment, includes: determining the number of beams within a cell of which the beam quality exceeds a quality threshold; determining cell signal quality according to the number of beams.

11 Claims, 4 Drawing Sheets

(51) Int. Cl.
*H04W 36/08* (2009.01)
*H04W 48/20* (2009.01)
*H04W 72/04* (2009.01)
*H04W 72/06* (2009.01)

(58) Field of Classification Search
CPC ... H04W 48/16; H04W 72/085; H04W 24/02; H04W 24/08; H04W 36/0083
USPC .......................................................... 370/331
See application file for complete search history.

(56) References Cited

U.S. PATENT DOCUMENTS

| | | | | |
|---|---|---|---|---|
| 10,524,181 | B2* | 12/2019 | Kim | H04W 4/70 |
| 11,044,650 | B2* | 6/2021 | Chen | H04W 36/08 |
| 2011/0263260 | A1* | 10/2011 | Yavuz | H04W 36/0085 455/437 |
| 2013/0058234 | A1* | 3/2013 | Yang | H04W 72/0446 370/252 |
| 2015/0222345 | A1* | 8/2015 | Chapman | H04B 7/0632 370/332 |
| 2016/0212631 | A1* | 7/2016 | Shen | H04W 56/001 |
| 2016/0262077 | A1* | 9/2016 | Zhang | H04W 24/10 |
| 2017/0339718 | A1 | 11/2017 | Liu et al. | |
| 2017/0367030 | A1 | 12/2017 | Liu et al. | |
| 2018/0324661 | A1* | 11/2018 | Ryden | H04B 7/0695 |
| 2018/0331746 | A1* | 11/2018 | Okuyama | H04B 7/063 |
| 2019/0132066 | A1* | 5/2019 | Park | H04W 36/0079 |
| 2020/0245213 | A1* | 7/2020 | Rune | H04B 7/0617 |
| 2021/0099940 | A1* | 4/2021 | Shen | H04W 36/30 |

FOREIGN PATENT DOCUMENTS

| | | |
|---|---|---|
| CN | 106576265 A | 4/2017 |
| KR | 20170072764 A | 6/2017 |

OTHER PUBLICATIONS

HTC et al. "Discussion on cell (re)selection while the beam number is less than N," R2-1711591, 3GPP TSG-RAN WG2 NR RAN2#99bis, Oct. 13, 2017, pp. 1-2.
International Search Report dated Apr. 11, 2019 in corresponding PCT Application No. PCT/CN2019/070695.
Written Opinion dated Apr. 11, 2019 in corresponding PCT Application No. PCT/CN2019/070695.

* cited by examiner

CELL SIGNAL QUALITY DETERMINATION METHOD, CELL SELECTION OR RESELECTION METHOD, DEVICE AND MEDIUM

CROSS-REFERENCE TO RELATED APPLICATION

The present disclosure is a U.S. continuation application of International Application No. PCT/CN2019/070695, filed on Jan. 7, 2019, which claims priority to Chinese Patent Application No. 201810055279.1, filed on Jan. 19, 2018. The contents of the above disclosures are incorporated herein by reference in their entirety.

BACKGROUND

In a wireless communication system, a wireless signal is used for communication. A carrier frequency of a wireless signal may be high or low. For example, for 5th-Generation (5G) communication, a frequency range of a carrier frequency is on a high band of 6 to 100 Ghz. Multiple carriers may be configured for each 5G New Radio (NR) cell using 5G spectrum resources, and in such case, cell signal quality is determined based on carrier quality of the multiple carriers. During cell selection or reselection of User Equipment (UE), it is necessary to consider cell signal quality of a cell.

It is found in a that UE may frequently perform cell selection or reselection, resulting in the problem that cell selection or reselection consumes much power of the UE to further cause a problem of standby time of the UE.

SUMMARY

The disclosure relates, but not limited, to the field of wireless communication, and particularly to a cell signal quality determination method, a cell selection or reselection method, a communication device and a storage medium.

In view of this, embodiments of the application are intended to provide a cell signal quality determination method, a cell selection or reselection method, a communication device and a storage medium.

The technical solutions of the application are implemented as follows. A first aspect of the embodiments of the application provides a cell signal quality determination method, which may be applied to a first communication device and include the following operations.

A number of beams of which beam quality exceeds a quality threshold in a cell is determined.

Cell signal quality is determined according to the number of beams.

A second aspect of the embodiments of the application provides a cell signal quality determination method, which may be applied to a second communication device and include the following operations.

A calculation parameter is acquired, the calculation parameter at least including a quality threshold and an offset, the quality threshold being configured for a first communication device to determine a number of beams of which beam quality exceeds the quality threshold, the offset and the number of beams being configured for a compensation value and the compensation value being configured to calculate cell signal quality.

The calculation parameter is sent.

A third aspect of the embodiments of the application provides a communication device, which may be a first communication device and include a first determination unit and a second determination unit.

The first determination unit may be configured to determine a number of beams of which beam quality exceeds a quality threshold in a cell.

The second determination unit may be configured to determine cell signal quality according to the number of beams.

A fourth aspect of the embodiments of the application provides a communication device, which may be a second communication device and include an acquisition unit and a sending unit.

The acquisition unit may be configured to acquire a calculation parameter, the calculation parameter at least including a quality threshold and an offset, the quality threshold being configured for a first communication device to determine a number of beams of which beam quality exceeds the quality threshold, the offset and the number of beams being configured to calculate a compensation value and the compensation value being configured to calculate cell signal quality.

The sending unit may be configured to send the calculation parameter.

A fifth aspect of the embodiments of the application provides a cell selection and reselection method, which may include the following operations.

A number of beams of which beam quality exceeds a quality threshold in a cell is determined.

A target cell for cell selection or reselection is determined according to the number of beams.

A sixth aspect of the embodiments of the application provides a communication device, which may include the following operations.

A number of beams of which beam quality exceeds a quality threshold in a cell is determined.

A target cell for cell selection or reselection is determined according to the number of beams.

A seventh aspect of the embodiments of the application provides a communication device, which may include a transceiver, a memory, a processor and computer programs stored in the memory and executed by the processor.

The transceiver may be configured to perform information interaction.

The memory may be configured for information storage.

The processor may be connected with the transceiver and the memory respectively, and may be configured to execute the computer programs to implement the cell signal quality determination method provided in the first aspect or implement the cell signal quality determination method provided in the second aspect or the cell selection or reselection method provided in the fifth aspect.

An eighth aspect of the embodiments of the application provides a computer storage medium, which may store computer programs, the computer programs being executed to implement the cell signal quality determination method provided in the first aspect, or the cell signal quality determination method provided in the second aspect or the cell selection or reselection method provided in the fifth aspect.

According to the cell signal quality determination method, cell selection or reselection method, communication device and storage medium provided in the embodiments of the application, when the cell signal quality is determined, it is determined based on the number of the beams of which the beam quality exceeds the quality threshold, and the determined cell signal quality is positively related to the number of the beams of which the beam quality exceeds the quality threshold. Therefore, the following circumstances may be avoided: reselecting a cell that some certain beams are high in quality but the number of the beams of which beam quality reaches the quality threshold is quite small, which triggers frequent cell selection or reselection, thereby, for example, consuming electric energy of UE by a ping-pong effect brought by cell reselection. Therefore, power consumption of the UE is reduced, and standby time of the UE is prolonged.

DETAILED DESCRIPTION

The technical solutions of the application will be further described below in combination with the drawings of the specification and specific embodiments in detail.

Figure 1:
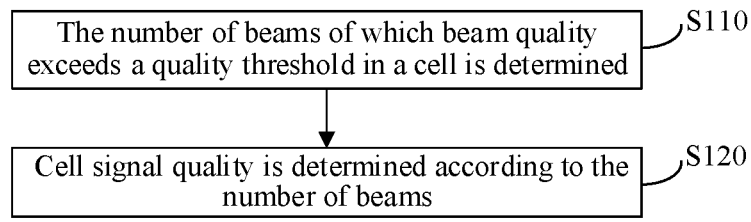
FIG. 1 is a flowchart of a first cell signal quality determination method according to embodiments of the application.

As shown in FIG. 1, an embodiment provides a cell signal quality determination method, which is applied to a first communication device. The first communication device may include UE or a base station. The following operations are included.

In S110, the number of beams of which beam quality exceeds a quality threshold in a cell is determined.

In S120, cell signal quality is determined according to the number of beams.

In some embodiments, the number of beams is positively related to the cell signal quality.

The UE provided in the embodiment may be various types of UE, for example, a portable communication terminal like a mobile phone, a tablet computer or a wearable device, a communication device like a vehicle-mounted terminal and/or an Internet of things terminal.

The beam quality of the beams of which the beam quality exceeds the quality threshold in the cell may be determined in S110. For example, beam quality of multiple beams transmitted by a cell corresponding to a present geographic position of the UE may be detected by beam measurement. When the first communication device is the UE, the UE may be UE in a connected state, and may preferably be UE in an inactive state or UE in an idle state.

The beam quality may be Reference Signal Receiving Power (RSRP), Reference Signal Receiving Quality (RSRQ) or Signal to Interference plus Noise Ratio (SINR), etc. that may represent the beam quality of the beam presently sent to the UE by the cell.

In the embodiment, a cell A sends four beams, and UE1 measures the four beams respectively. If beam quality of two measured beams exceeds the quality threshold, the two beams are the beams of which the beam quality exceeds the quality threshold.

In the embodiment, when the cell signal quality is calculated, two parameters, i.e., the beam quality of the beams of which the beam quality exceeds the quality threshold and the number of the beams of which the beam quality exceeds the quality threshold, may be comprehensively considered. If the number of beams is positively related to the cell signal quality, it is indicated that changing direction of the number of the beams of which the beam quality exceeds the quality threshold and changing direction of the cell signal quality are the same. In some embodiments, the number of the beams of which the beam quality exceeds the quality threshold is positively related to a compensation value of the cell signal quality, namely the cell signal quality is positively related to the compensation value.

In the embodiment, S120 may include the following operations.

A first quality parameter is determined according to the beam quality of the beams of which the beam quality exceeds the quality threshold.

A second quality parameter is determined according to the number of the beams of which the beam quality exceeds the quality threshold.

The cell signal quality is determined in combination with the first quality parameter and the second quality parameter.

In the embodiment, the first quality parameter may be a linear mean of the beam quality of the beams of which the beam quality exceeds the quality threshold.

If the number of the beams of which the beam quality exceeds the quality threshold is K, the second quality parameter may be a quality regulation value corresponding to the K beams of which the beam quality exceeds the quality threshold, the quality regulation value being positively related to a value of K.

The cell signal quality is determined by two parts, i.e., the first quality parameter and the second quality parameter. In some embodiments, if first quality parameters of two cells are the same, the cell signal quality is higher when K is greater, and the cell signal quality is lower when K is smaller. That is, the number (i.e., K) of the beams of which the beam quality exceeds the quality threshold is positively related to the cell signal quality.

If the cell signal quality is higher, a probability that the cell is reselected by the UE is higher.

In a word, the cell signal quality is configured for cell selection or reselection of the UE.

An embodiment of the application also provides a cell selection or reselection method, which may include the following operations.

Beam quality of beams in a cell is determined.

The number of beams K of the beams of which the beam quality exceeds a quality threshold is determined.

Cell signal quality is calculated in combination with the beam quality of the beams of which the beam quality exceeds the quality threshold and K.

Cell selection or reselection is performed according to the cell signal quality. A magnitude of the cell signal quality is positively related to a magnitude of K.

For example, the operation that cell selection or reselection is performed according to the cell signal quality includes the following operation.

A cell with high cell signal quality is selected as a cell reselected for residing.

Figure 2:
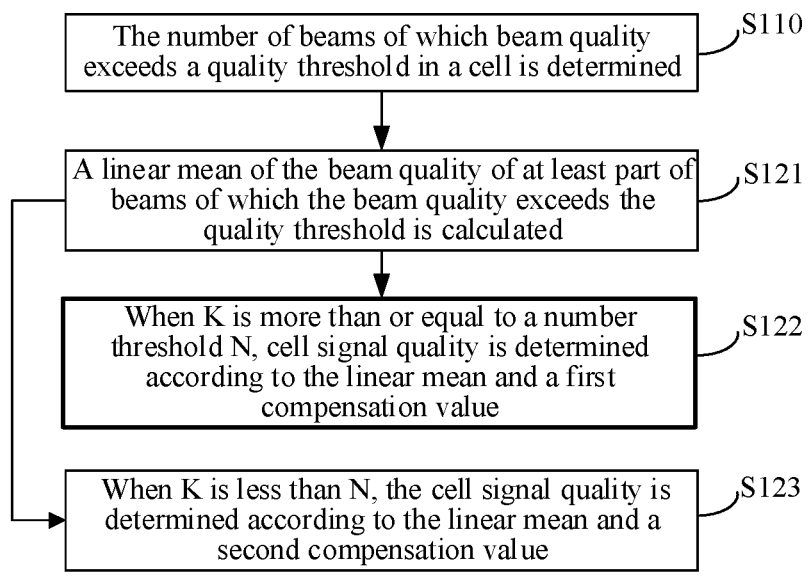
FIG. 2 is a flowchart of a second cell signal quality determination method according to embodiments of the application.

In some embodiments, as shown in FIG. 2, S120 may include the following steps.

In S121, a linear mean of the beam quality of at least part of beams of which the beam quality exceeds the quality threshold is calculated. For example, if the beam quality of N beams exceed the quality threshold, the at least part of beams of which the beam quality exceeds the quality threshold may include the beam quality of the N beams or the beam quality of S beams in the N beams, S being a positive integer less than N.

In S122, when K is more than or equal to a number threshold N, the cell signal quality is determined according to the linear mean and a first compensation value, the cell signal quality being not less than the linear mean.

And/or, in S123, when K is less than N, the cell signal quality is determined according to the linear mean and a second compensation value, the cell signal quality being less than the linear mean.

In the embodiment, the linear mean is equivalent to the abovementioned first quality parameter. In some embodiments, the first quality parameter may also be a median of the beam quality of the beams of which the beam quality exceeds the quality threshold. In a word, the first quality parameter is not limited to the linear mean.

When K is more than or equal to the number threshold, the cell signal quality is determined according to the linear mean and the first compensation value. The cell signal quality obtained in such a manner may be greater than the linear mean.

When K is less than the number threshold, it is indicated that the present number of the beams of which the beam quality exceeds the quality threshold is relatively small. For reducing the possibility that selecting a corresponding cell by the UE, the cell signal quality less than the linear mean may be obtained based on the linear mean and the second compensation value.

In some embodiments, the first compensation value may be a positive compensation value of the linear mean, and the second compensation value may be a negative compensation value of the linear mean.

In the embodiment, the linear mean may be a weighted mean of beam quality of multiple beams.

In the embodiment, determination of a compensation value by the number threshold and the number of beams is introduced, and whether the compensation value is the aforementioned first compensation value or the aforementioned second compensation value is determined by a relationship between the number of beams K and the number threshold, so that it is ensured that the cell signal quality is positively related to K. Each of the first compensation value and the second compensation value may be one of the abovementioned second quality parameter. Furthermore, final cell signal quality may be calculated in combination with the linear mean and the first compensation value or the second compensation value, and a reference parameter may be provided for cell selection or reselection of the UE.

In the embodiment, the first compensation value and second compensation value serving as the second quality parameter is related to the number threshold, and in some embodiments, may only be related to the number of beams K.

In some embodiments, there are multiple implementable manners for S122. Eight optional manners are provided below.

A first optional manner: S122 may include the following operation.

The cell signal quality is calculated by using the following formula:

$$\text{cell signal quality} = f(Q\text{beam}1, Q\text{beam}2, \ldots, Q\text{beam}N) + (K-N)^m * Q\text{offset}1.$$

A second optional manner: S122 may include the following formula:

$$\text{cell signal quality} = f(Q\text{beam}1, Q\text{beam}2, \ldots, Q\text{beam}N) * (K/N)^m * Q\text{offset}1.$$

A third optional manner: S122 may include the following formula:

$$\text{cell signal quality} = f(Q\text{beam}1, Q\text{beam}2, \ldots, Q\text{beam}K) + (K-N)^m * Q\text{offset}1.$$

A fourth optional manner: S122 may include the following formula:

$$\text{cell signal quality} = f(Q\text{beam}1, Q\text{beam}2, \ldots, Q\text{beam}K) * (K/N)^m * Q\text{offset}1.$$

A fifth optional manner:

$$\text{cell signal quality} = f(Q\text{beam}1, Q\text{beam}2, \ldots, Q\text{beam}N) + (K-N)^m.$$

A sixth optional manner:

$$\text{cell signal quality} = f(Q\text{beam}1, Q\text{beam}2, \ldots, Q\text{beam}N) * (K/N)^m.$$

A seventh optional manner:

$$\text{cell signal quality} = f(Q\text{beam}1, Q\text{beam}2, \ldots, Q\text{beam}N) * (K/N)^m.$$

An eighth optional manner:

$$\text{cell signal quality} = f(Q\text{beam}1, Q\text{beam}2, \ldots, Q\text{beam}K) * (K/N)^m.$$

In the above optional manners:

f(Qbeam1, Qbeam2, . . . , QbeamN) is a linear mean of beam quality of N beams, the N beams being N beams with highest beam quality in the cell.

f(Qbeam1, Qbeam2, . . . , QbeamK) is a linear mean of the beam quality of K beams, the beam quality of the K beams exceeding the quality threshold. Therefore, in the first optional manner, the second optional manner, the fifth optional manner and the sixth optional manner, only the beam quality of the N beams which have the highest beam quality and of which the beam quality exceeds the quality threshold is involved in calculation of the cell signal quality. However, in the third optional manner, the fourth optional manner, the seventh optional manner and the eighth optional manner, the beam quality of all the beams of which the beam quality exceeds the quality threshold is involved in calculation of the cell signal quality.

In the abovementioned calculation function relationships, N is the number threshold, Offset1 is a first offset value, and Qbeamx is the beam quality of the xth beam.

In the embodiment, Qoffset1 may be an offset preconfigured by a network-side device such as the base station or a Mobility Management Entity (MME). In the embodiment, a value of the first offset is a positive number, m may be a positive number, and a value of m may be a decimal or an integer, optionally 1, 2 or 3, etc. Here, m is one of exponential parameters for calculation of the compensation value of the cell signal quality.

There may also be multiple implementable manners for S123. Some optional manners are provided below.

A first optional manner:

$$\text{cell signal quality} = f(Q\text{beam}1, Q\text{beam}2, \ldots, Q\text{beam}N) + (K-N)^m.$$

A second optional manner:

$$\text{cell signal quality} = f(Q\text{beam}1, Q\text{beam}2, \ldots, Q\text{beam}K) + (K-N)^m * Q\text{offset}2.$$

A third optional manner:

$$\text{cell signal quality} = f(Q\text{beam}1, Q\text{beam}2, \ldots, Q\text{beam}N) * (K/N)^m.$$

A fourth optional manner:

$$\text{cell signal quality} = f(Q\text{beam}1, Q\text{beam}2, \ldots, Q\text{beam}K) * (K/N)^m * Q\text{offset}2.$$

A fifth optional manner:

$$\text{cell signal quality} = f(Q\text{beam}1, Q\text{beam}2, \ldots, Q\text{beam}N) * (K-N)^m.$$

A sixth optional manner:

$$\text{cell signal quality} = f(Q\text{beam}1, Q\text{beam}2, \ldots, Q\text{beam}N) + (K-N)^m * Q\text{offset}2.$$

A seventh optional manner:

$$\text{cell signal quality} = f(Q\text{beam}1, Q\text{beam}2, \ldots, Q\text{beam}N) * (K/N)^m.$$

An eighth optional manner:

$$\text{cell signal quality} = f(Q\text{beam}1, Q\text{beam}2, \ldots, Q\text{beam}N) * (K/N)^m * Q\text{offset}2.$$

$f(Q\text{beam}1, Q\text{beam}2, \ldots, Q\text{beam}K)$ is the linear mean of the beam quality of the K beams, the K beams being beams of which the beam quality exceeds the quality threshold. $f(Q\text{beam}1, Q\text{beam}2, \ldots, Q\text{beam}N)$ is the linear mean of the beam quality of the N beams with the highest beam quality. Qoffset2 is a second offset value, Qbeamx is the beam quality of the xth beam, x is an integer less than or equal to K, and the value of m is a positive number.

In the embodiment, $f(Q\text{beam}1, Q\text{beam}2, \ldots, Q\text{beam}K)$ is the linear mean of the beam quality of the beams of which the beam quality exceeds the quality threshold, namely corresponding to the abovementioned first quality parameter. $(K-N)*Q\text{offset}2$ or $(K/N)*Q\text{offset}2$ corresponds to the abovementioned second quality parameter.

It is apparent that K is positively related to the cell signal quality in the embodiment, which may be reflected as a directly proportional relationship or positively weighted relationship, etc. between K and the cell signal quality.

In some embodiments, the value of Qoffset1 is the same as the value of Qoffset2. In a word, the UE may receive the two parameters Qoffset1 and Qoffset2 from the base station.

In some other embodiments, under the two circumstances that K is less than N and K is more than or equal to N, the same offset is involved in calculation of the cell signal quality, and the offset may be called a shared offset. In such case, the base station may only transmit a value of Qoffset0 to the UE.

No matter whether K is less than N or K is more than or equal to the value of N, at least one of the following formulae may be adopted to calculate the cell signal quality.

$$\text{cell signal quality} = f(Q\text{beam}1, Q\text{beam}2, \ldots, Q\text{beam}N) + (K-N)^m;$$

$$\text{cell signal quality} = f(Q\text{beam}1, Q\text{beam}2, \ldots, Q\text{beam}N) + (K-N)^m * Q\text{offset}0;$$

$$\text{cell signal quality} = f(Q\text{beam}1, Q\text{beam}2, \ldots, Q\text{beam}N) * (K/N)^m;$$

$$\text{cell signal quality} = f(Q\text{beam}1, Q\text{beam}2, \ldots, Q\text{beam}N) * (K/N)^m * Q\text{offset}0;$$

$$\text{cell signal quality} = f(Q\text{beam}1, Q\text{beam}2, \ldots, Q\text{beam}K) + (K-N)^m;$$

$$\text{cell signal quality} = f(Q\text{beam}1, Q\text{beam}2, \ldots, Q\text{beam}K) + (K-N)^m * Q\text{offset}0;$$

$$\text{cell signal quality} = f(Q\text{beam}1, Q\text{beam}2, \ldots, Q\text{beam}K) * (K/N)^m; \text{ and}$$

$$\text{cell signal quality} = f(Q\text{beam}1, Q\text{beam}2, \ldots, Q\text{beam}K) * (K/N)^m * Q\text{offset}0.$$

In some embodiments, the cell signal quality may also directly be $f(Q\text{beam}1, Q\text{beam}2, \ldots, Q\text{beam}K)$.

Figure 8:
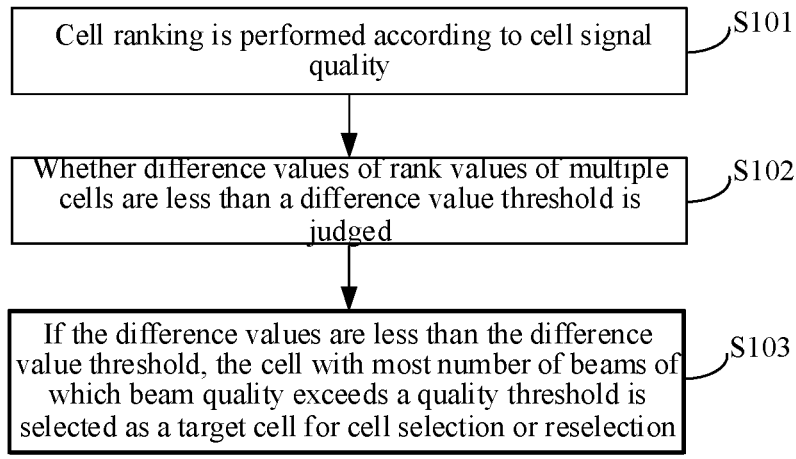
FIG. 8 is a flowchart of a cell signal quality-based cell selection or reselection method according to embodiments of the application.

As shown in FIG. 8, the following method may be adopted to implement cell selection or reselection of the UE according to the cell signal quality.

In S101, cell ranking is performed according to cell signal quality.

In S102, whether difference values of rank values of multiple cells are less than a difference value threshold is judged.

In S103, if the difference values are less than the difference value threshold, the cell with most number of beams of which beam quality exceeds the quality threshold is selected as a target cell for cell selection or reselection.

Under some circumstances, if the method in the embodiment is adopted for cell selection or reselection, the cell signal quality may be a linear mean of beam quality of beams in the corresponding cell. For example, if a cell A having M beams of which beam quality exceeds the quality threshold is selected, cell quality of the cell A may be a mean of the beam quality of the M beams.

Under some other circumstances, the cell signal quality configured to calculate the rank value of cell in the embodiment may also be cell signal quality positively related to the number of the beams exceeding the quality threshold.

In the embodiment, the cell signal quality may be a value of the RSRP or the RSRQ, etc. In the embodiment, the rank value of cell is calculated based on the cell signal quality. For example, the UE, during initial network access, may scan networks nearby, and then calculate cell signal quality, and then perform cell ranking according to the cell signal quality and judge whether difference values of rank values of cells with highest rank value among multiple cells scanned by the UE are less than the difference value threshold or not. If the difference values are less than the difference value threshold, it is indicated that the signal quality of the cells is close, and in such case, the UE preferably selects the cell with most number of beams of which beam quality exceeds the quality threshold as a cell initially selected by the UE to complete cell selection.

According to some embodiments, whether a difference value between a rank value of each of the multiple cells and a highest rank value of all of the multiple cells is less than the difference value threshold is judged. If one or more of the difference values are less than the difference value threshold, selecting, among cells whose difference values are less than the difference value threshold, the cell with most number of the beams of which beam quality exceeds the quality threshold as the target cell for cell selection or reselection.

During initial cell selection of the UE, the rank value of cell may be calculated by the following formula:

R=Qmeas. For example, Qmeas is a linear mean value of beams in the cell. For another example, Qmeas may also be a sum of the linear mean value and the first compensation value or the second compensation value.

In some embodiments, R=Qmeans may be RSRP or RSRQ of a reference signal.

Cell reselection may refer to that the UE has accessed a network and the UE may perform cell reselection when a reselection condition is met. In such case, a present serving cell has existed for the UE. Under a normal circumstance, the UE may scan cell signal quality of the serving cell and a neighbor cell adjacent to the serving cell, the cell signal quality being calculated in any manner in the embodiment, then perform cell ranking based on the cell signal quality and compare difference values of rank values and the difference value threshold for cell reselection.

For example, cell ranking is performed according to the cell signal quality, and for multiple cells scanned by the UE, whether difference values of rank values of cells with highest rank values are less than the difference value threshold is judged. If the difference values are less than the difference value threshold, it is indicated that the signal quality of the cells is close, and in such case, the UE preferably selects the cell with most number of beams of which beam quality exceeds the quality threshold to complete cell reselection of the UE.

During cell reselection, when the rank values of the serving cell and the neighbor cell are close, for reducing unnecessary reselection of the UE, the rank values of cells may be calculated through the following function relationships:

$$R_s = Qmeas,s + Q_{Hyst} - Qoffset_{temp}, \text{ and}$$

$$R_n = Qmeas,n - Qoffset - Qoffset_{temp},$$

where $R_s$ may be the rank value of the serving cell, $R_n$ may be the rank value of the neighbor cell, $Q_{Hyst}$ may be a measurement hysteresis of the serving cell, Qmeas,n is the cell signal quality of the neighbor cell and, for example, may be RSRQ or RSRP, Qmeas,s is the cell signal quality of the serving cell, Qoffset is a first measurement offset of the neighbor cell, and $Qoffset_{temp}$ is a temporary offset of the cell.

In some embodiments, S101 may include at least one of the following operations.

Whether difference values of rank values of multiple intra-frequency cells are less than the difference value threshold is judged.

Whether difference values of rank values of multiple inter-frequency cells with the same priority are less than the difference value threshold is judged. The intra-frequency cells are cells with the same cell frequency point, and the inter-frequency cells are cells with different cell frequency points. If the multiple cells are neither intra-frequency cells nor inter-frequency cells with the same priority, they are not cells for cell selection or reselection based on the difference value threshold. Therefore, the problem that, when the cell reselection or selection method provided in the embodiment is adopted for inter-frequency cells with different priorities, the UE selects a cell with poor cell signal quality to further cause poor communication quality of the UE is solved.

Some manners for calculating the cell signal quality are provided above. However, during specific embodiment, the embodiment is not limited to any one of them.

Figure 3:
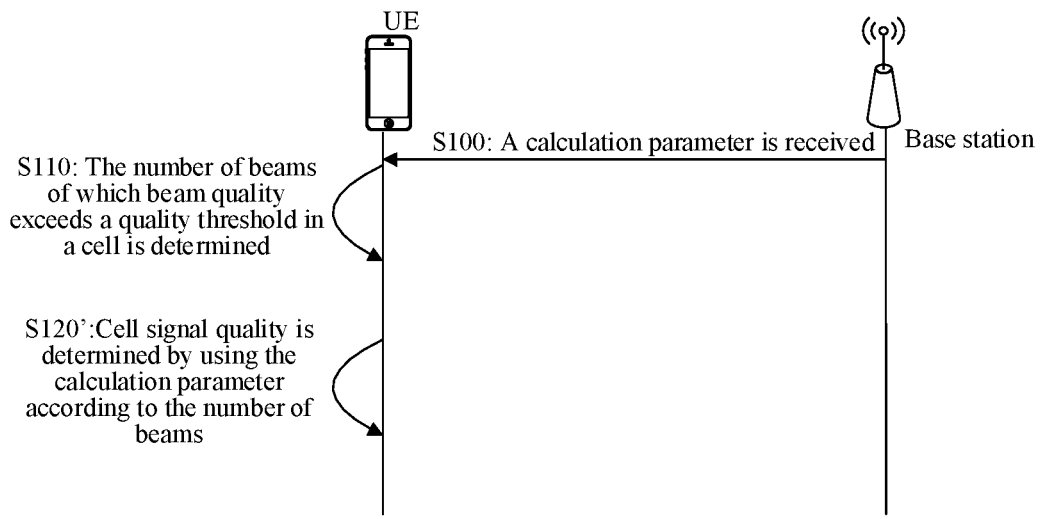
FIG. 3 is a flowchart of a third cell signal quality determination method according to embodiments of the application.

In some embodiments, as shown in FIG. 3, the method further includes the following step.

In S100, a calculation parameter is received from a base station. In the embodiment, the calculation parameter may further include a calculation function. Here, the calculation function may be the calculation relationships in S122 and/or S123. The calculation function may also be a functional relationship determined in advance by negotiation between the base station and the UE or having been written into a communication standard, namely preconfigured in the UE. In a word, the calculation parameter may be various parameters configured to calculate the cell signal quality. The calculation parameter may include a symbol parameter such as an operational symbol and a variable parameter such as a dependent variable, for example, a variable parameter like the number of beams, the offset and the beam quality and so on. In some embodiments, the calculation parameter may further include the difference value threshold. The difference value threshold is configured to determine the target cell for cell reselection. If the difference values of the rank values of the multiple cells are less than the difference value threshold, the cell with most number of beams of which the beam quality exceeds the quality threshold is selected as the target cell. The rank value of cell is determined based on the cell signal quality of the cell.

In some embodiments, the calculation parameter may be pre-stored in the first communication device, and the first communication device is only required to locally read the calculation parameter. For example, the calculation parameter may be specified in a communication protocol, and the calculation parameter is written in the first communication device before delivery from the factory. In some other embodiments, the calculation parameter may be determined in advance by negotiation between the first communication device and a second communication device, and when S110 to S120 are executed this time, the calculation parameter is only required to be locally read.

S120 may include S120'. S120' may include that the cell signal quality is determined by using the calculation parameter according to the number of beams.

In the embodiment, the calculation parameter may include one or more of the quality threshold, the number threshold, the offset and the exponential parameter. In the embodiment, the offset may be one or more of the first offset, the second offset and the shared offset. The exponential parameter may be m in the abovementioned function.

In the embodiment, S100 may include the following operations: a broadcast message containing the calculation parameter is received from the base station; and/or, a request message is sent to the base station and the calculation parameter sent by the base station based on the request message is received.

In the embodiment, the broadcast message may be a system message. The calculation parameter may be directly contained in the broadcast message, and in such case, UE in the cell may receive the calculation parameter.

The broadcast message may contain one or more System Information Blocks (SIBs), and the calculation parameter may be a message content in the SIB and, for example, is carried in a specific field in the SIB.

In some embodiments, the system message may be a primary system message and a secondary system message. The primary system message may be periodically broadcast by the base station, and the secondary system message may be sent by the base station only based on a request of the UE. The calculation parameter may also be contained in the secondary system message, and if a piece of new UE resides in the cell, the UE may request the base station for the secondary system message through a random access request and the like and then may receive the parameter sent through the secondary system message. Therefore, in some embodiments, the UE may send a request to the base station and receive the calculation parameter returned by the base station based on the request to calculate the cell signal quality.

In some embodiments, the request message is sent based on, not limited to, the random access request. In some other embodiments, the random access request may also be sent based on other sending manners.

The calculation parameter may be broadcast in the cell after the base station receives the request, and may also be unicast to the UE through a unicast message such as a Radio Resource Connection (RRC). In some other embodiments, it may also be multicast to multiple pieces of UE requesting for the calculation parameter in a multicast manner.

In some embodiments, S120 may include the following operation.

When the UE is in an idle state or an inactive state, the cell signal quality is determined according to the beam quality of the beams of which the beam quality exceeds the quality threshold and K.

In the embodiment, the method provided in the embodiment of the application is adopted to calculate the cell signal quality positively related to K only when the UE is in the idle state or the inactive state.

The idle state refers to a state that the UE does not establish an RRC with a network side. The inactive state refers to a state that the UE does not establish the RRC with the network side but establishes a connection with a core network side.

The network side may include a wireless side and the core network side connected with the wireless side. A wireless network element of a typical wireless side may include a base station or a Radio Network Controller (RNC). A network element of a typical core network may include an MME or a Gateway (GW), etc.

Of course, in some embodiments, the method may further be applied to UE in the connected state. The connected state refers to a state that the UE establishes connections with both the wireless side and the core network side.

Figure 4:
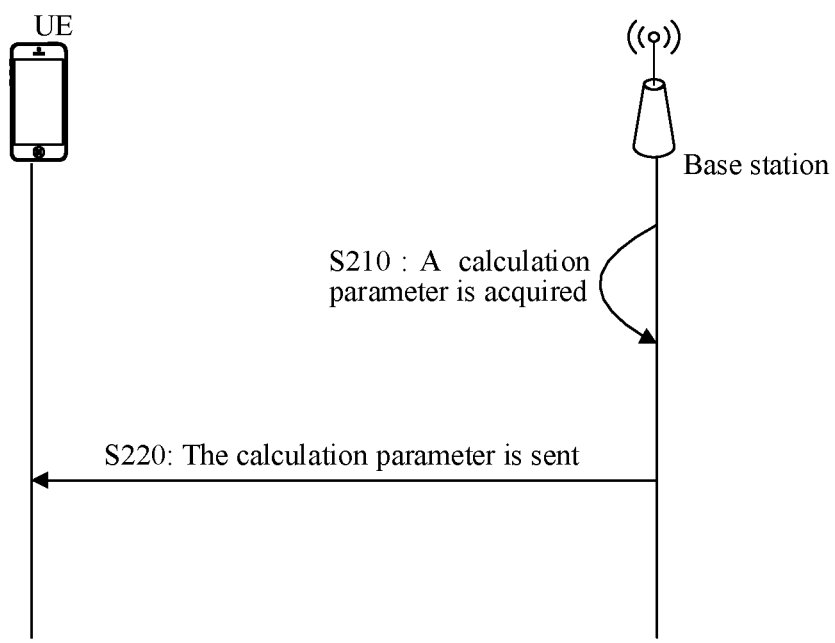
FIG. 4 is a flowchart of a fourth cell signal quality determination method according to embodiments of the application.

As shown in FIG. 4, an embodiment of the application provides a cell signal quality determination method, which is applied to a second communication device. The second communication device may a device such as a base station. The following operations are included.

In S210, a calculation parameter is acquired, the calculation parameter at least including a quality threshold and an offset, the quality threshold being configured for a first communication device to determine the number of beams of which beam quality exceeds the quality threshold, the offset and the number of beams being configured to calculate a compensation value and the compensation value being configured to calculate cell signal quality.

In S220, the calculation parameter is sent.

Here, the base station may be a wireless-side device, and may be an Evolved Node B (eNB) or a gNB, etc.

The operation in S210 that the calculation parameter is acquired may include that a preconfigured calculation parameter is read, and may also include that the calculation parameter is dynamically determined based on a reference parameter. In the embodiment, the calculation parameter may at least include the quality threshold, and the quality threshold may be configured for UE to determine the beams of which the beam quality exceeds the quality threshold, i.e., good beams with high beam quality. For example, the quality threshold for the beam quality of a present cell and the like may be dynamically determined according to a present load.

The operation in S220 that the calculation parameter is sent may specifically include that the calculation parameter is broadcast in a broadcast message. For example, a system message containing the calculation parameter is periodically broadcast.

In some embodiments, S220 may include the following operations.

A request message sent by UE is received.

After the request message is received, the calculation parameter is sent.

In some other embodiments, S220 may include the following operations.

UE requesting for the calculation parameter in a predetermined time bucket is counted.

When the number of the UE exceeds a predetermined value, the calculation parameter is broadcast, or the calculation parameter is broadcast to multiple pieces of UE requesting for the calculation parameter.

When the number of the UE is less than the predetermined value, the calculation parameter is unicast to the UE requesting for the calculation parameter.

The predetermined value may be a specific value such as 1, 2 or 3.

In some embodiments, a number threshold is configured to calculate the cell signal quality.

An exponential parameter is configured to calculate the compensation value.

The offset includes at least one of a first offset, a second offset or a shared offset. The first offset is configured to, when the number of beams K is more than or equal to N, calculate the compensation value, N being the number threshold. The second offset is configured to, when K is less than N, calculate the compensation value. The shared offset is configured to, when K is more than or equal to N or K is less than N, calculate the compensation value. The compensation value is configured to determine the cell signal quality. Here, the exponential parameter may be m mentioned above. The calculation parameter may further include another parameter in the abovementioned functions, for example, an operational symbol in a calculation function.

In some embodiments, the calculation parameter further includes a difference value threshold. The difference value threshold is configured to determine a target cell for cell reselection. If difference values of rank values of multiple cells are less than the difference value threshold, the cell with most number of beams of which beam quality exceeds the quality threshold is selected as the target cell. The rank values of cells are determined based on cell signal quality of the cell.

In some embodiments, values of the first offset and the second offset are the same.

In some other embodiments, the offset is not distinguished as the first offset and the second offset, the cell signal quality may be calculated based on the same offset no matter whether K is not less than N or less than N, and the offset is called the shared offset.

An embodiment also provides another information processing method, which includes the following operations.

A base station sends a calculation parameter.

UE receives the calculation parameter.

The UE determines the number of beams of which quality beam exceeds a quality threshold in a cell of which cell signal quality is to be calculated.

The UE, by taken the number of beams as a dependent variable, calculates the cell signal quality positively related to the number of beams by using the calculation parameter].

The UE performs cell selection or reselection according to the cell signal quality.

If the cell signal quality is higher, a probability that the corresponding cell is reselected is higher.

In some embodiments, the calculation parameter may at least include at least one of the abovementioned first offset, the abovementioned second offset or the abovementioned shared offset. The values of the first offset and the second offset may be equal and may also be unequal. The first offset and the second offset may be collectively referred to as offset. The offset may be a parameter statically configured in the base station and may also be dynamically determined by the base station.

The shared offset may be configured to calculate the cell signal quality when K is less than N and may also be configured to calculate the cell signal quality when K is more than or equal to N.

For example, the offset may be positively related to a cell frequency point of the cell. For example, the cell frequency point is a carrier frequency that the cell may provide. Therefore, determining the cell signal quality may not only reduce a cell selection or reselection frequency of the UE but also promote preferable selection of a high-frequency-point cell to ensure communication quality of the UE.

For another example, the offset is negatively related to a load of the cell. Therefore, determining the cell signal quality may not only reduce the cell selection or reselection frequency of the UE but also enable the UE to preferably reselect a cell with a relatively low load to implement load balance between cells.

In some embodiments, the number threshold may be preconfigured by the base station and may also be dynamically determined according to a parameter of the cell. For example, N may be positively related to the total number of beams provided by the cell. In such case, different cells correspond to different values of N.

Figure 9:
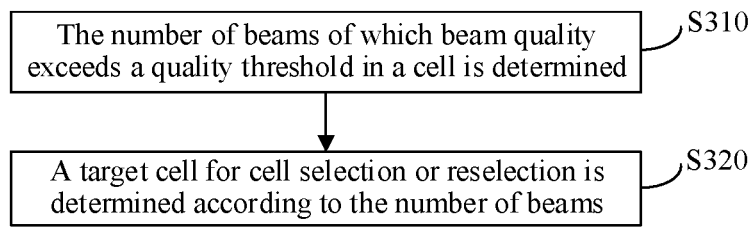
FIG. 9 is a flowchart of a cell selection or reselection method according to embodiments of the application.

As shown in FIG. 9, an embodiment of the application also provides a cell selection or reselection method, which includes the following operations.

In S310, the number of beams of which beam quality exceeds a quality threshold in a cell is determined.

In S320, a target cell for cell selection or reselection is determined according to the number of beams.

In the embodiment, the target cell for cell selection or reselection may be selected directly according to the number of the beams of which the beam quality exceeds the quality threshold in the corresponding cell. For example, a terminal selects a cell with most number of beams of which beam quality exceeds the quality threshold in multiple cells that are presently measured as the target cell to complete initial cell selection or reselection. In some embodiments, cell signal quality is not needed to be calculated during cell selection or reselection. However, in some embodiments, the cell signal quality is further calculated, and then the target cell is selected based on the cell signal quality and the number of the beams of which the beam quality exceeds the quality threshold in the cell. Therefore, S320 may include the following operations.

Cell ranking is performed based on cell signal quality.

Whether difference values of rank values of multiple cells are less than a difference value threshold is judged.

If the difference values are less than the difference value threshold, the cell with the largest number of beams is selected as the target cell for cell selection or reselection.

Here, the cell signal quality may be calculated by any method, and for example, may be calculated by the method shown in FIG. 1 to FIG. 4.

In some embodiments, the operation that whether the difference values of the rank values of the multiple cells are less than the difference value threshold is judged includes at least one of the following operations.

Whether difference values of rank values of multiple intra-frequency cells are less than the difference value threshold is judged.

Whether difference values of rank values of multiple inter-frequency cells with the same priority are less than the difference value threshold is judged.

In the embodiment, the difference value threshold may be transmitted by the base station through various messages, for example, transmitted through a system message, and may also be preconfigured in the UE.

Figure 10:
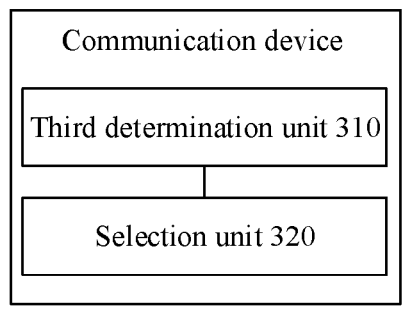
FIG. 10 is a structure diagram of another communication device according to embodiments of the application.

As shown in FIG. 10, an embodiment also provides a communication device, which includes a third determination unit 310 and a selection unit 320.

The third determination unit 310 is configured to determine the number of beams of which beam quality exceeds a quality threshold in a cell.

The selection unit 320 is configured to determine a target cell for cell selection or reselection according to the number of beams, for example, selecting a cell with the largest number of beams as the target cell for cell selection or reselection.

Both the third determination unit 310 and the selection unit 320 may correspond to program units and may implement counting of the beams of which the beam quality exceeds the quality threshold and selection of the target cell through a processor.

The selection unit 320 is configured to perform cell ranking based on cell signal quality, judge whether difference values of rank values of multiple cells are less than a difference value threshold and, if the difference values are less than the difference value threshold, select the cell with the largest number of beams as the target cell for cell selection or reselection.

The difference values of the rank values of the multiple cells include:

difference values of the rank values of the multiple cells. For example, for a cell A and a cell B, the difference value of the rank values is a difference value between a rank value of the cell A and a rank value of the cell B.

According to some embodiments, whether a difference value between a rank value of each of the multiple cells and a highest rank value of all of the multiple cells is less than the difference value threshold is judged. If one or more of the difference values are less than the difference value threshold, selecting, among cells whose difference values are less than the difference value threshold, the cell with most number of the beams of which beam quality exceeds the quality threshold as the target cell for cell selection or reselection.

In some embodiments, the selection unit 320 is further configured to execute at least one of the following operations.

Whether difference values of rank values of multiple intra-frequency cells are less than the difference value threshold is judged.

Whether difference values of rank values of multiple inter-frequency cells with the same priority are less than the difference value threshold is judged.

Some specific examples will be provided below in combination with any embodiment.

Example 1

The example provides a cell signal quality determination method, which includes the following operations.

A network side broadcasts a parameter related to calculation of cell signal quality (i.e., a calculation parameter), which may include a quality threshold "Threshold" for judging whether a beam is a good beam and a maximum number threshold "N" of beams involved in calculation of the cell signal quality.

Particularly, the beam quality may be RSRP, RSRQ or a SINR.

The calculation parameter may be acquired by periodic broadcast through a system message or in an on demand manner, namely obtained based on a request of UE to a base station.

UE in an idle state or an inactive state calculates quality of a serving cell and a neighbor cell by using the following formula.

According to the actually measured number K of beams exceeding the threshold, regulation is performed based on a linear mean to obtain final cell signal quality. For example, when K>N, the cell signal quality may be increased; and when K<N, the cell signal quality may be decreased.

If the actually measured number of beams exceeding the quality threshold in a cell is K>=N, cell signal quality=linear mean (Qbeam1, Qbeam2, . . . , QbeamN)+(K−N)*Qoffset1, or, cell signal quality=linear mean (Qbeam1, Qbeam2, . . . , QbeamN)*K/N*Qoffset1, where Qbeam1, Qbeam2, . . . , QbeamN are quality of N best beams detected by the UE and exceeding the quality threshold, and Qoffset1 is an offset of the cell signal quality.

If the actually measured number of the beams exceeding the quality threshold in a cell is K<N, cell signal quality=linear mean($Q$beam1, $Q$beam2, . . . ,$Q$beam$K$)+($K-N$)$^m$*$Q$offset2, or a transformation:

cell signal quality=linear mean($Q$beam1, $Q$beam2, . . . ,$Q$beam$K$)*$K/N$*$Q$offset2, where Qbeam1, Qbeam2, . . . , QbeamK are quality of K best beams detected by the UE and exceeding the quality threshold, and Qoffset2 is an offset of the cell signal quality.

Particularly, for the same cell selection or reselection process, Qoffset2 may be the same as or different from Qoffset1. For cell selection and reselection processes, the corresponding two parameters may be the same and may also be different. A sending manner for the two parameters may be periodic system broadcast and may also be on demand sending (they may be sent together with the quality threshold "Threshold" and N or independently), or they may also be values specified in a standard. The UE executes a cell selection or reselection process according to the calculated quality of the serving cell and the neighbor cell and a selection or reselection criterion defined in the standard.

Example 2

For cell signal quality calculation in a cell selection or reselection process of UE in an idle state or an inactive state, both a linear mean result of multiple best beams and the number of good beams meeting a threshold are required to be considered. If a numerical value of a linear mean of good beams is considered (as shown in Table 1), a cell with a small number of good beams may be selected or reselected. Quality of a beam changes fast, and as a result, the UE may frequently perform reselection or a ping-pong reselection effect may be brought to increase power consumption of the UE.

| Cell information | Cell 1 has 5 good beams | Cell 2 has 3 good beams | Cell 3 has 1 good beam |
|---|---|---|---|
| Good beams of which quality is greater than the quality threshold −110 dBm(10-11 mw) | −95 dBm(31.6*10-11 mw) −100 dBm(10*10-11 mw) −100 dBm(10*10-11 mw) −108 dBm(1.58*10-11 mw) −108 dBm(1.58*10-11 mw) | −95 dBm(31.6*10-11 mw) −100 dBm(10*10-11 mw) −105 dBm(3.16*10-11 mw) | −105 dBm(3.16*10-11 mw) |
| Cell signal quality when N = 5 | 10.952*10-11 mw | 14.92*10-11 mw | 3.16*10-11 mw |
| Cell signal quality when N = 4 | 13.295*10-11 mw | 14.92*10-11 mw | 3.16*10-11 mw |
| Cell signal quality when N = 3 | 17.2*10-11 mw | 14.92*10-11 mw | 3.16*10-11 mw |
| Cell signal quality when N = 2 | 20.8*10-11 mw | 20.8*10-11 mw | 3.16*10-11 mw |
| Cell signal quality when N = 1 | 31.6*10-11 mw | 31.6*10-11 mw | 3.16*10-11 mw |

It may be seen from Table 1 that, when N=5/4, cell signal quality of a cell 2 is highest and, when N=3/2/1, signal quality of a cell 1 is highest. In practice, the cell 1 includes more good beams and three best beams are better than three beams of the cell 2, so that it is more reasonable for the UE to select or reselect the cell 1. Therefore, reasonable cell calculation is related to the number of measured good beams and also related to a value of N configured by a network side. The application discloses a method for cell signal quality calculation based on all of a linear mean result of good beams, the number of the good beams and N configured by the network side, to meet selection or reselection requirements of the UE in the idle state and the inactive state.

In example 1 and example 2, the good beam is a beam of which beam quality is greater than the quality threshold, i.e., the abovementioned beam of which the beam quality exceeds the quality threshold.

Example 3

The example provides a cell selection or reselection method, which includes the following operations.

A base station broadcasts a parameter related to cell quality calculation, for example, a calculation parameter like a quality threshold, a number threshold and a difference value threshold.

UE calculates cell quality of a neighbor cell and/or a present cell by using a linear mean formula.

For intra-frequency cells or inter-frequency cells with the same priority, ranking is performed on the present serving cell and the neighbor cell according to a rank value criterion:

$$R_s = Qmeas,s + Q_{Hyst} - Qoffset_{temp}, \text{ and}$$

$$R_n = Qmeas,n - Qoffset - Qoffset_{temp}.$$

In the example, Qmeas,s is RSRP of the serving cell, $Q_{Hyst}$ is a measurement hysteresis of the serving cell, Qmeas,n is RSRP of a target cell, Qoffset is a first measurement offset of the target cell, and $Qoffset_{temp}$ is a temporary offset of the cell. For cells of which the ranking difference is in a certain difference value threshold (Delta), it is considered that quality of the cells are close, and the UE preferably reselects the cell with most number of beams of which quality exceeds the threshold.

Particularly, a value of Delta may be defined in a standard and fixed in the standard, and may also be sent to the UE by the base station in a broadcast or on demand manner.

Figure 5:
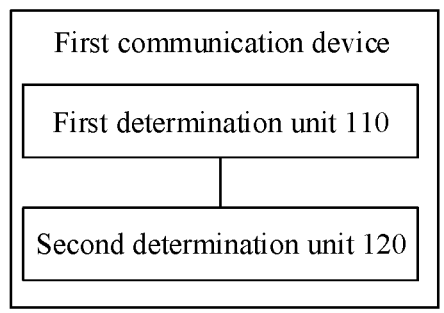
FIG. 5 is a structure diagram of UE according to embodiments of the application.

As shown in FIG. 5, an embodiment provides a communication device, which is a first communication device. The first communication device may be UE, and includes a first determination unit 110 and a second determination unit 120.

The first determination unit 110 is configured to determine the number of beams of which beam quality exceeds a quality threshold in a cell.

The second determination unit 120 is configured to determine cell signal quality according to the number of beams.

In some embodiments, K is positively related to the cell signal quality.

Both the first determination unit 110 and the second determination unit 120 may correspond to a central processing unit, microprocessor, digital signal processor, application processor, programmable array or application processor, etc. in the UE.

The processor may execute executable instructions such as computer programs to determine the cell signal quality positively related to the cell signal quality.

In some embodiments, the second determination unit 120 specifically calculates a linear mean of the beam quality of at least part of beams of which the beam quality exceeds the quality threshold, and when the number of beams K is more than or equal to a number threshold N, determines the cell signal quality according to the linear mean and a first compensation value, the cell signal quality being not less than the linear mean, or, when K is less than N, determines the cell signal quality according to the linear mean and a second compensation value, the cell signal quality being less than the linear mean.

In some embodiments, the second determination unit 120 may be configured to calculate the cell signal quality by at least one of the following functions:

$$\text{cell signal quality} = f(Qbeam1, Qbeam2, \ldots, QbeamN) + (K-N)^m;$$

$$\text{cell signal quality} = f(Qbeam1, Qbeam2, \ldots, QbeamN) + (K-N)^m * Qoffsety;$$

$$\text{cell signal quality} = f(Qbeam1, Qbeam2, \ldots, QbeamN) * (K/N)^m;$$

$$\text{cell signal quality} = f(Qbeam1, Qbeam2, \ldots, QbeamN) * (K/N)^m * Qoffsety;$$

$$\text{cell signal quality} = f(Qbeam1, Qbeam2, \ldots, QbeamK) + (K-N)^m;$$

$$\text{cell signal quality} = f(Qbeam1, Qbeam2, \ldots, QbeamK) + (K-N)^m * Qoffsety;$$

$$\text{cell signal quality} = f(Qbeam1, Qbeam2, \ldots, QbeamK) * (K/N)^m; \text{ and}$$

$$\text{cell signal quality} = f(Qbeam1, Qbeam2, \ldots, QbeamK) * (K/N)^m * Qoffsety.$$

f(Qbeam1, Qbeam2, . . . , QbeamN) is a linear mean of beam quality of N beams with highest beam quality, and f(Qbeam1, Qbeam2, . . . , QbeamK) is a linear mean of the beam quality of K beams of which the beam quality exceeds the quality threshold.

N is the number threshold.

K is the number of the beams of which the beam quality exceeds the quality threshold.

Qbeamx is beam quality of the xth beam, and a value of x is 1 to N or 1 to K.

A value of m is a positive number.

In some embodiments, Qoffsety corresponds to different parameters according to different magnitudes of K and N. For example, when K is more than or equal to the number threshold N, Qoffsety is a first offset Qoffset1, and when K is less than N, Qoffsety is a second offset Qoffset2.

In some other embodiments, regardless of the magnitudes of K and N,

Qoffsety corresponds to the same parameter. For example, Qoffsety is a shared offset Qoffset0.

The first communication device further includes a receiving unit and the second determination unit 120.

The receiving unit is configured to receive a calculation parameter from a base station, the calculation parameter including at least one of the quality threshold, the number threshold or the offset.

The second determination unit 120 is configured to determine, according to the number of beams, the cell signal quality by use of the calculation parameter.

Furthermore, the receiving unit is configured to receive a broadcast message containing the calculation parameter from the base station, and/or send a request message to the base station and receive the calculation parameter sent by the base station based on the request message.

In some embodiments, the second determination unit 120 is configured to, when the UE is in an idle state or an inactive state, determine the cell signal quality according to the number of beams.

Figure 6:
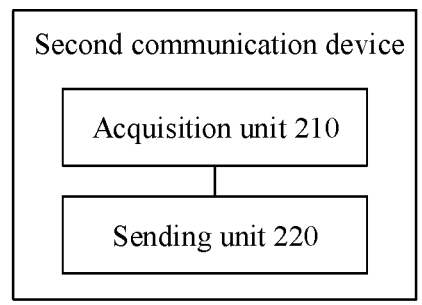
FIG. 6 is a structure diagram of a base station according to embodiments of the application.

In some embodiments, as shown in FIG. 6, an embodiment also provides a communication device, which may be a second communication device. The second communication device may be a base station, and includes an acquisition unit 210 and a sending unit 220.

The acquisition unit 210 is configured to acquire a calculation parameter, the calculation parameter at least including a quality threshold and an offset, the quality threshold being configured for a first communication device to determine the number of beams of which beam quality exceeds the quality threshold, the offset and the number of beams being configured to calculate a compensation value and the compensation value being configured to calculate cell signal quality.

The sending unit 220 is configured to send the calculation parameter.

The acquisition unit 210 may correspond to a processor of the base station, and the processor may be a central processing unit, a microprocessor, a digital signal processor, an application processor or a programmable array, etc.

The sending unit 220 may correspond to a sending antenna or a sending antenna array, and may be configured to send the calculation parameter.

In some embodiments, the calculation parameter may further include at least one of:

a number threshold, the number threshold being configured to calculate the cell signal quality;

the offset, configured to calculate the compensation value, the compensation value being configured to calculate the cell signal quality. The offset includes at least one of a first offset, a second offset or a shared offset. The first offset is configured to, when the number of beams K is more than or equal to N, calculate the compensation value. The second offset is configured to, when K is less than N, calculate the compensation value. The shared offset is configured to, when K is more than or equal to N or K is less than N, calculate the compensation value; and a difference threshold value, configured to determine a target cell for cell reselection. A cell with most number of beams of which beam quality exceeds the quality threshold being selected as the target cell if difference values of rank values of multiple cells are less than the difference value threshold. The rank values are determined based on cell signal quality of the cell.

Figure 7:
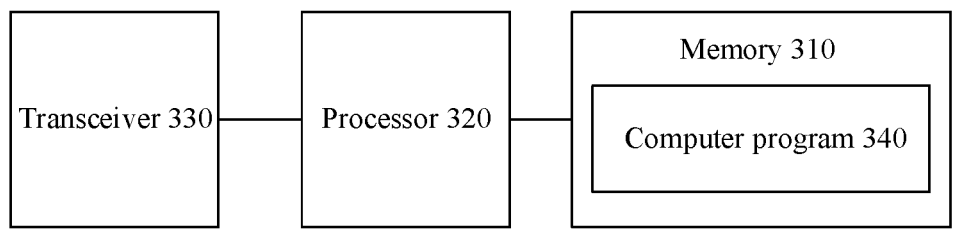
FIG. 7 is a structure diagram of a communication device according to embodiments of the application.

An embodiment also provides a communication device, which may be the abovementioned UE or base station. As shown in FIG. 7, the communication device may include:

a transceiver 330, a memory 310, a processor 320 and computer programs 340 stored in the memory 310 and run by the processor 330.

The processor 320 is connected with the memory 310 and the transceiver 330 respectively, and is configured to execute the computer program to execute the cell signal quality determination method or cell selection or reselection method provided in any one or more technical solutions, for example, one or more of the methods shown in FIG. 1 to FIG. 4 and FIG. 8 to FIG. 9.

In the embodiment, the transceiver 330 may correspond to a transceiver antenna, and the transceiver antenna may be configured for information interaction between a base station and UE.

The memory 310 may include various types of storage media, and may be configured for data storage. In the embodiment, at least part of storage media in the memory 310 are nonvolatile storage media and may be configured to store the computer programs 340.

The processor 320 may include a central processing unit, a microprocessor, a digital signal processor, an application processor, an application-specific integrated circuit or a programmable array, etc. and may be configured to execute the computer programs 340 to determine cell signal quality.

In the embodiment, the processor 320 may be connected with the transceiver 330 and the memory 310 through an in-device bus such as an integrated circuit bus.

An embodiment of the application also provides a computer storage medium, which stores computer programs, the computer programs being executed by a processor to execute the cell signal quality determination method or cell selection or reselection method provided in one or more abovementioned technical solutions, for example, one or more of the methods shown in FIG. 1 to FIG. 4 and FIG. 8 to FIG. 9.

The computer storage medium provided in the embodiment of the application includes: various media capable of storing program codes such as a mobile storage device, a Read-Only Memory (ROM), a Random Access Memory (RAM), a magnetic disk or a compact disc. Optionally, the computer storage medium may be a non-transitory storage medium. Here, the non-transitory storage medium may also be called a nonvolatile storage medium.

In some embodiments provided by the application, it is to be understood that the disclosed device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the application may be integrated into a processing module, each unit may also serve as an independent unit and two or more than two units may also be integrated into a unit. The integrated unit may be implemented in a hardware form and may also be implemented in form of hardware and software functional unit.

Those of ordinary skill in the art should know that all or part of the operations of the method embodiment may be implemented by related hardware instructed through a program, the program may be stored in a computer-readable storage medium, and the program is executed to execute the steps of the method embodiment. The storage medium includes: various media capable of storing program codes such as a mobile storage device, a ROM, a RAM, a magnetic disk or a compact disc.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A cell selection and reselection method, comprising:
   determining a number of beams of which beam quality exceeds a quality threshold in a cell; and
   determining a target cell for cell selection or reselection according to the number of beams,
   wherein determining the target cell for cell selection or reselection according to the number of beams comprises:
   performing cell ranking based on cell signal quality;
   judging whether a difference value between a rank value of each of multiple cells and a highest rank value of all of the multiple cells is less than a difference value threshold; and
   if one or more the difference values are less than the difference value threshold, selecting, among cells having the difference values being less than the difference value threshold, the cell with a largest number of beams as the target cell for cell selection or reselection.

2. The method of claim 1, wherein
judging whether the difference values of the rank values of the multiple cells are less than the difference value threshold comprises at least one of:
judging whether difference values of rank values of multiple intra-frequency cells are less than the difference value threshold; or
judging whether difference values of rank values of multiple inter-frequency cells with a same priority are less than the difference value threshold.

3. The method of claim 1, further comprising:
determining cell signal quality according to the number of beams.

4. The method of claim 3, wherein the number of beams is positively related to the cell signal quality.

5. A communication device, comprising: a transceiver, a memory, a processor and computer programs stored in the memory and executed by the processor, wherein
the transceiver is configured to perform information interaction;
the memory is configured for information storage; and
the processor is connected with the transceiver and the memory respectively, and when the computer programs are executed by the processor, the processor is configured to:
determine a number of beams of which beam quality exceeds a quality threshold in a cell; and
determine a target cell for cell selection or reselection according to the number of beams,
wherein determining the target cell for cell selection or reselection according to the number of beams comprises:
performing cell ranking based on cell signal quality;
judging whether a difference value between a rank value of each of multiple cells and a highest rank value of all of the multiple cells is less than a difference value threshold; and
if one or more the difference values are less than the difference value threshold, selecting, among cells having the difference values being less than the difference value threshold, the cell with a largest number of beams as the target cell for cell selection or reselection.

6. The communication device of claim 5, wherein the processor is specifically configured to perform at least one of:
judging whether difference values of rank values of multiple intra-frequency cells are less than the difference value threshold; or
judging whether difference values of rank values of multiple inter-frequency cells with a same priority are less than the difference value threshold.

7. The communication device of claim 5, the processor is further configured to:
determine cell signal quality according to the number of beams.

8. The communication device of claim 7, wherein the number of beams is positively related to the cell signal quality.

9. A non-transitory computer storage medium, storing computer programs, the computer programs being executed to perform:
determining a number of beams of which beam quality exceeds a quality threshold in a cell; and
determining a target cell for cell selection or reselection according to the number of beams,
wherein determining the target cell for cell selection or reselection according to the number of beams comprises:
performing cell ranking based on cell signal quality;
judging whether a difference value between a rank value of each of multiple cells and a highest rank value of all of the multiple cells is less than a difference value threshold; and
if one or more the difference values are less than the difference value threshold, selecting, among cells having the difference values being less than the difference value threshold, the cell with a largest number of beams as the target cell for cell selection or reselection.

10. The non-transitory computer storage medium according to claim 9, wherein
judging whether the difference values of the rank values of the multiple cells are less than the difference value threshold comprises at least one of:
judging whether difference values of rank values of multiple intra-frequency cells are less than the difference value threshold; or
judging whether difference values of rank values of multiple inter-frequency cells with a same priority are less than the difference value threshold.

11. The non-transitory computer storage medium according to claim 9, wherein the computer programs are executed to further perform:
determining cell signal quality according to the number of beams.

* * * * *